United States Patent [19]

Merchant

[11] Patent Number: 5,083,042
[45] Date of Patent: Jan. 21, 1992

[54] UNPLUGGING APPARATUS
[76] Inventor: Roger R. Merchant, 811 9th St., St. Paul, Nebr. 68873
[21] Appl. No.: 549,419
[22] Filed: Jul. 6, 1990
[51] Int. Cl.⁵ ............................................ H01R 13/635
[52] U.S. Cl. ......................................... 307/149; 361/1; 361/170
[58] Field of Search .................... 340/601, 602; 361/1, 361/111, 139, 160, 170, 212, 216, 117, 120; 73/170 R; 307/149; 324/72; 439/152, 258, 923

[56] References Cited
U.S. PATENT DOCUMENTS 2,265,868 12/1941 Schonland ............................ 361/120
4,276,576 6/1981 Uman ..................................... 361/1
4,702,537 10/1987 Mattingly et al. ................... 439/152

Primary Examiner—A. D. Pellinen
Assistant Examiner—C. S. Schultz
Attorney, Agent, or Firm—Zarley, McKee, Thomte Voorhees & Sease

[57] ABSTRACT

An unplugging apparatus includes an electrical sensing circuit for sensing the approach of an electrical storm, and a mechanical actuator for disconnecting a power cord plug from a receptacle in response to a signal from the sensing circuit. The sensing circuit and the mechanical actuator are mounted within a housing. A pull cord extends from the housing and is connected to the power cord plug to disconnect the plug from the receptacle. The other end of the pull cord is connected to a pivotable trigger arm, which pivots to pull the pull cord in response to activation by the sensing circuit. A coil spring biases the trigger arm so as to pull the pull cord, and a latch is operable to retain the trigger arm until actuated by the sensing circuit. A solenid is energized to operate the latch and release the trigger arm, by a signal from the sensing circuit. The sensing circuit includes a detector circuit which receives static produced by lightning in the form of radio waves. The detector circuit produces a signal in response to radio waves of a predetermined amplitude. The signal produced by the detector circuit is then converted to a audio signal and amplified. The amplified signal will energize a relay which closes a second circuit energizing the solenoid.

12 Claims, 3 Drawing Sheets

UNPLUGGING APPARATUS

TECHNICAL FIELD

The present invention relates generally to devices for disconnecting a plug from its associated jack, and more particularly to a novel unplugging apparatus which will sense the approach of electrical storms.

BACKGROUND OF THE INVENTION

Lightning strikes from electrical storms are a serious threat to all types of electrical equipment. A nearby lightning strike can burn out circuits in an electrical device such that repair is impossible and replacement is the only alternative. While there are various types of surge and spike protectors on the market, these are not designed to protect against the extreme conditions present during a lightning strike. Similarly, lightning arrestors are not always capable of preventing damage from a nearby lightning strike.

In fact, the only true and safe method for protecting electrical devices from lightning strikes is to physically disconnect the electrical device from the source of power. Examples include electrical plugs for various devices and appliances, antenna plugs from various wall receptacles, and cable connections from a cable television input line. While the safest method of lightning protection is simple to accomplish, it is quite time consuming for a person to unplug and disconnect all of the various electrical appliances in the home. Furthermore, a human is not always present at computer equipment or other electrical appliances when an electrical storm strikes the area, thereby preventing removal of the plug.

It is therefore a general object of the present invention to provide an improved unplugging apparatus.

Another object of the present invention is to provide an unplugging apparatus which is selectively operable to unplug an electrical plug from a wall receptacle.

A further object is to provide an unplugging apparatus which will sense the approach of an electrical storm and operate to unplug one or more selected electrical devices.

Still another object of the present invention is to provide an unplugging apparatus which is refined in appearance and simple to operate.

These and other objects of the present invention will be apparent to those skilled in the art.

SUMMARY OF THE INVENTION

The unplugging apparatus of the present invention includes an electrical sensing circuit for sensing the approach of an electrical storm, and a mechanical actuator for disconnecting a power cord plug from a receptacle in response to a signal from the sensing circuit. The sensing circuit and the mechanical actuator are mounted within a housing. A pull cord extends from the housing and is connected to the power cord plug to disconnect the plug from the receptacle. The other end of the pull cord is connected to a pivotable trigger arm, which pivots to pull the pull cord in response to activation by the sensing circuit. A coil spring biases the trigger arm so as to pull the pull cord, and a latch is operable to retain the trigger arm until actuated by the sensing circuit. A solenoid is energized to operate the latch and release the trigger arm, by a signal from the sensing circuit. The sensing circuit includes a detector circuit which receives static produced by lightning in the form of radio waves. The detector circuit produces a signal in response to radio waves of a predetermined amplitude. The signal produced by the detector circuit is then converted to a audio signal and amplified. The amplified signal will energize a relay which closes a second circuit energizing the solenoid. A potentiometer permits adjustment of the sensitivity of the detector circuit.

DESCRIPTION OF THE PREFERRED EMBODIMENT

Figure 1:
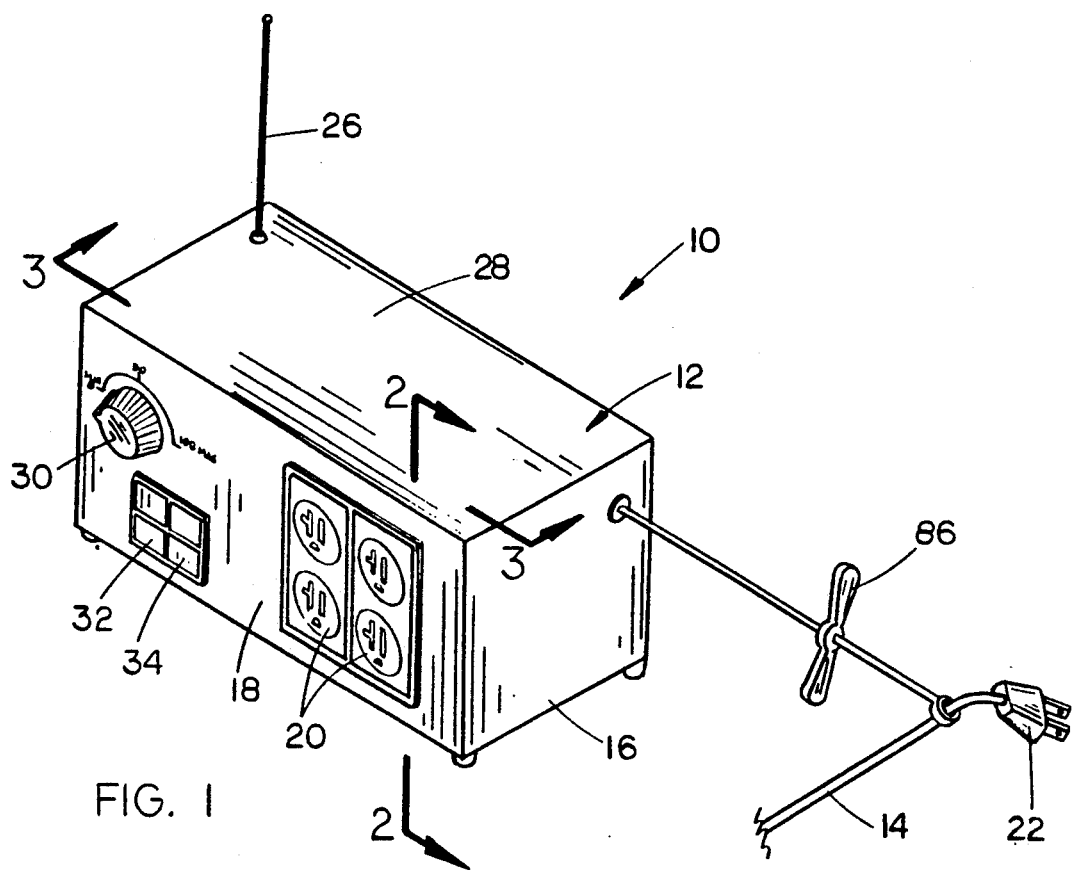
FIG. 1 is a front elevational view of the present invention.

Referring now to the drawings, in which similar or corresponding parts are identified with the same reference numeral, and more particularly to FIG. 1, the unplugging apparatus of the present invention is designated generally at 10, and includes a hollow housing 12 with a retractable power cord 14 extending from one end 16 thereof.

The front face 18 of housing 12 has a plurality of electrical receptacles 20 thereon which are electrically connected to power cord 14. Power cord 14 has a conventional plug 22 at the free end thereof adapted for connection with a wall receptacle 24 (see FIG. 3). Thus, power cord 14 supplies electrical power from wall receptacle 24 to receptacles 20 on front face 18.

An antenna 26 is connected to the top 28 of housing 12 and will sense the approach of an electrical storm. An adjustable knob 30 will adjust the sensitivity of antenna 26, as described in more detail hereinbelow. A pair of on/off switches 32 and 34 are provided on front face 18. On/off switch 32 is electrically connected to the sensing circuit 88 (shown in FIG. 5). On/off switch 34 is electrically connected to power cord 14 to open or close the circuit providing electrical power from wall receptacle 24 to receptacles 20.

Figure 2:
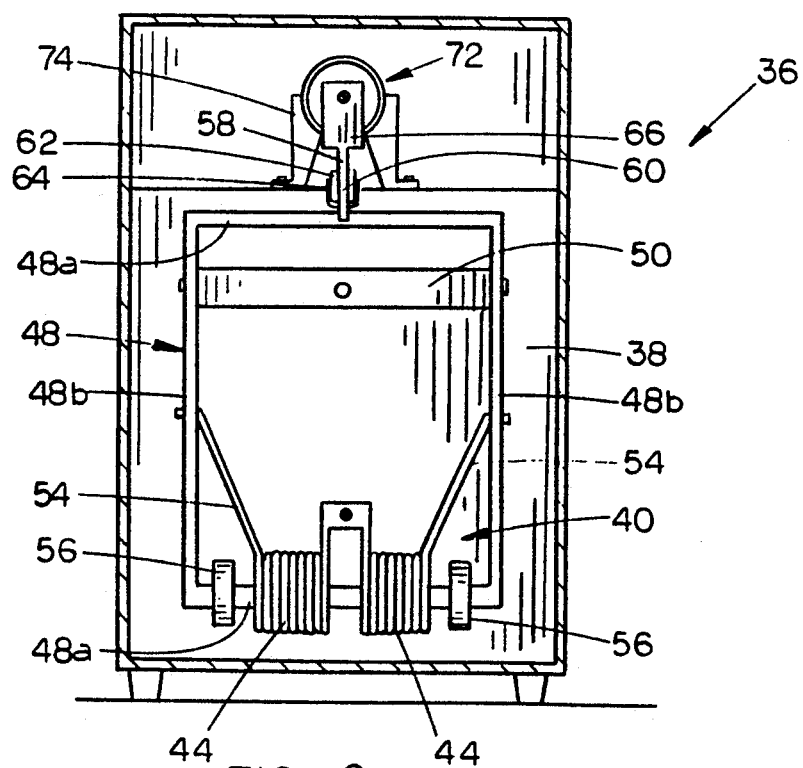
FIG. 2 is a sectional view taken at lines 2—2 in FIG. 1.
Figure 3:
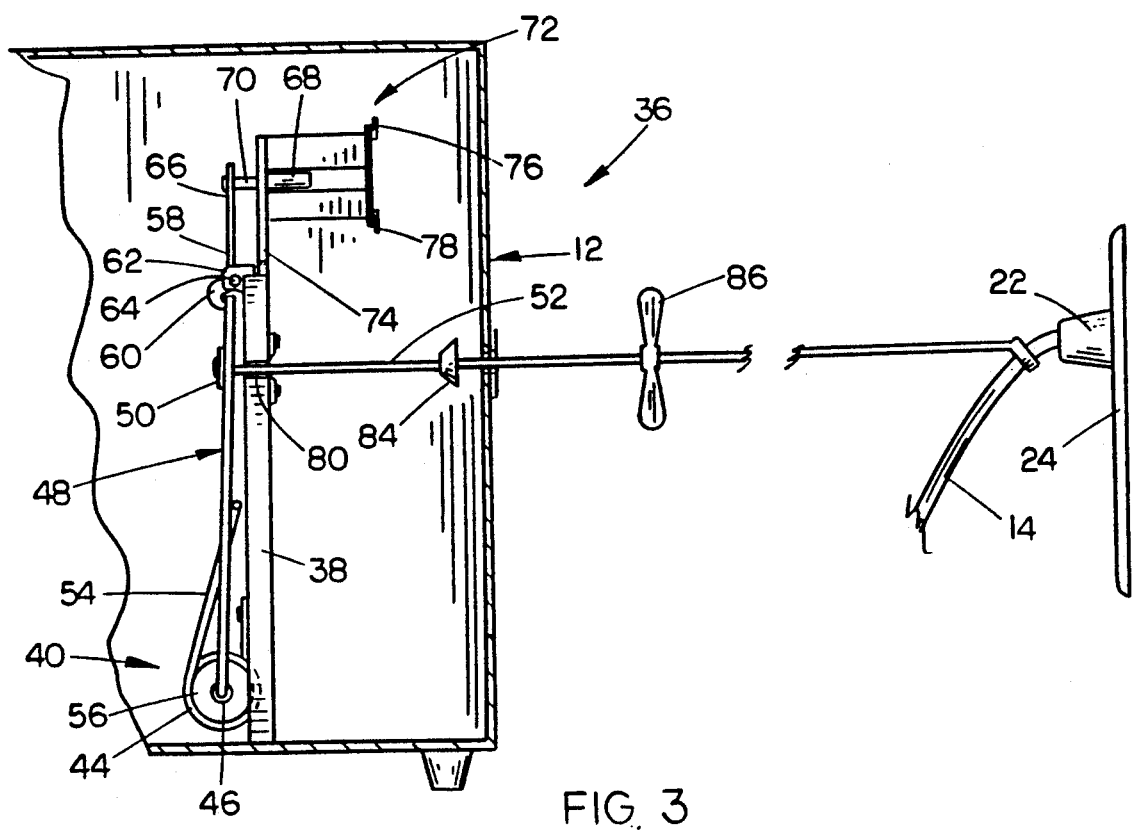
FIG. 3 is a sectional view taken at lines 3—3 in FIG. 1.
Figure 4:
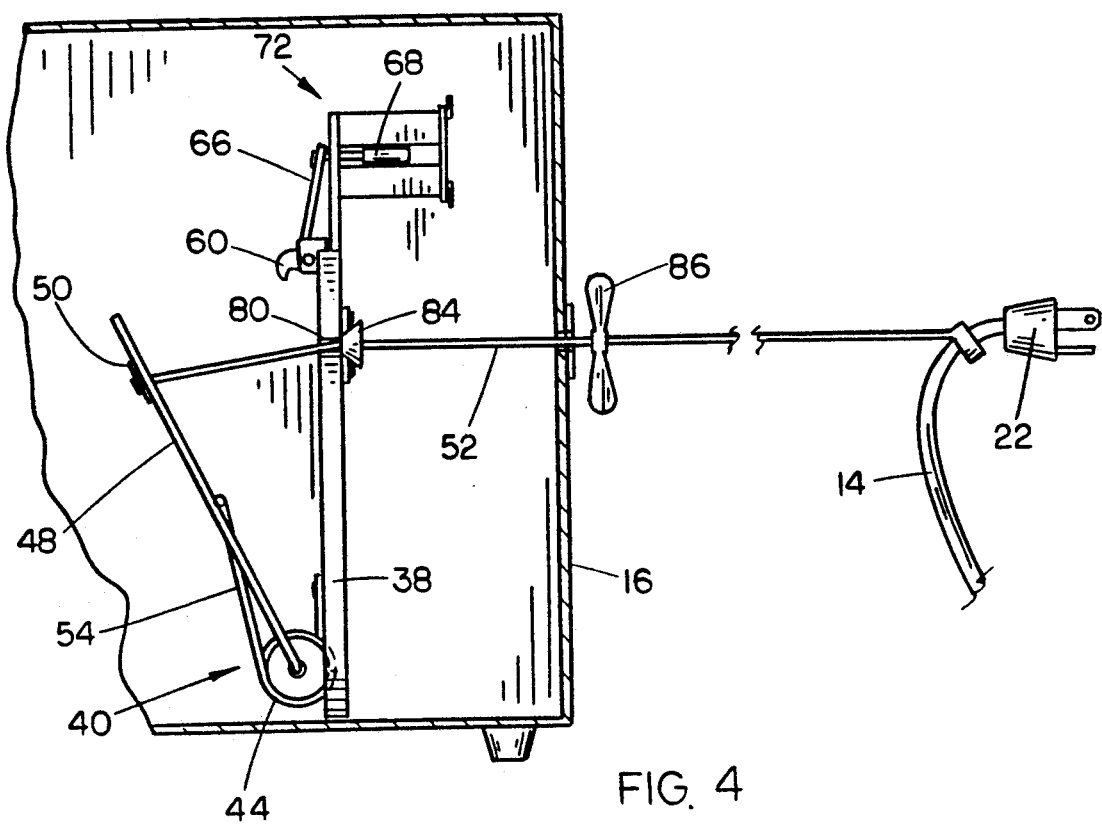
FIG. 4 is a sectional view taken similar to FIG. 3, but with the trigger arm pulling the power cord plug.

Referring now to FIGS. 2-4, unplugging apparatus 10 includes a mechanical actuator, designated generally at 36, mounted within housing 12, which will physically remove plug 22 of power cord 14 from wall receptacle 24. Actuator 36 includes a vertically oriented support plate 38 mounted parallel to end wall 16 of housing 12, and spaced therefrom. A coil spring 40 is mounted to the lower end of what will be described as the rearward face 42 of support plate 38. Coil spring 40 includes a pair of coaxial coils 44 having a hollow central core 46 through which a trigger arm 48 is journaled, and through which trigger arm 48 is freely rotatable. As shown in FIG. 2, trigger arm 48 has a generally horizontal base rod 48a extending through coils 44 and projecting outwardly therefrom. A pair of upright rods 48b extend generally vertically upwardly from the ends of base rod 48a, and are connected at their upper ends by a horizontally oriented top rod 48c. Thus, trigger arm 48 is a rigid rectangular member pivotally mounted through coils 44.

A cross bar 50 is attached to trigger arm 48 and extends between upright rods 48b, and is located adjacent to but spaced away from top rod 48c. One end of a nylon pull cord 52 is connected to cross bar 50, for movement therewith as trigger arm 48 pivots within coils 44.

A pair of spring arms 54 extend from spring coils 44 and are connected to each upright rod 48b, so as to bias trigger arm 48 away from support plate 38, as shown in FIG. 4. A pair of support bearings 56 are mounted to support plate 38 adjacent coils 44, through which base rod 48a is pivotally supported, to prevent excess wear on coil spring 40. A spring-loaded trip latch 58 is pivotally mounted to the top end of support plate 38 with a latch hook 60 extending downwardly to retain top rod 48c of trigger 48 against the bias of coil spring 40. A coil spring 62 will pivot latch hook 60 about a pin 64, to urge the latch hook 60 into its latched position retaining trigger arm 48. A lever 66 is connected at one end to latch hook 60 and serves to pivot latch hook 60 against the bias of coil spring 62, to release trigger arm 48. The upper end of lever 66 is connected to a solenoid piston 68 by a connecting rod 70, such that piston 68 will pivot latch hook 60 when solenoid 72 is energized.

Solenoid 72 is mounted to the top of support plate 38 by bracket 74, and has a pair of electrical terminals 76 and 78 projecting therefrom for connection to a selectively energizable source of power, to be described in more detail hereinbelow.

Nylon pull cord 52 extends from cross bar 50 through an aperture 80 in support plate 38 and thence through an aperture 82 in end wall 16 and is connected to power cord 14 immediately adjacent plug 22. A stop 84 is affixed to pull cord 52 between support plate 38 and end wall 16, and serves to prevent pull cord 52 from being pulled too far through support plate 38, upon triggering of trigger arm 48. A small handle 86 is affixed to pull cord 52 between end wall 16 and plug 22, and allows the user to reset trigger arm 48 by pulling on pull cord 52 until trigger arm 58 is reset in latch hook 60.

In operation, the sensing circuit of the invention, as described hereinbelow, will detect the approach of an electrical storm, and energize solenoid 72. When solenoid 72 is energized, it causes solenoid piston 68 to move and pivot lever 66 and latch hook 60. Trigger arm 48 is released and coil spring 40 pivots rearwardly about base rod 48a. Trigger arm 48 pulls nylon pull cord 52 so as to pull plug 22 out of wall receptacle 24. Once solenoid 72 is de-energized, coil spring 62 causes lever 66 to be moved outwardly, resetting solenoid piston 68 for activation. The unplugging apparatus 10 may be reset by simply pulling on handle 86 until trigger arm 48 is retained by latch hook 60.

Figure 5:
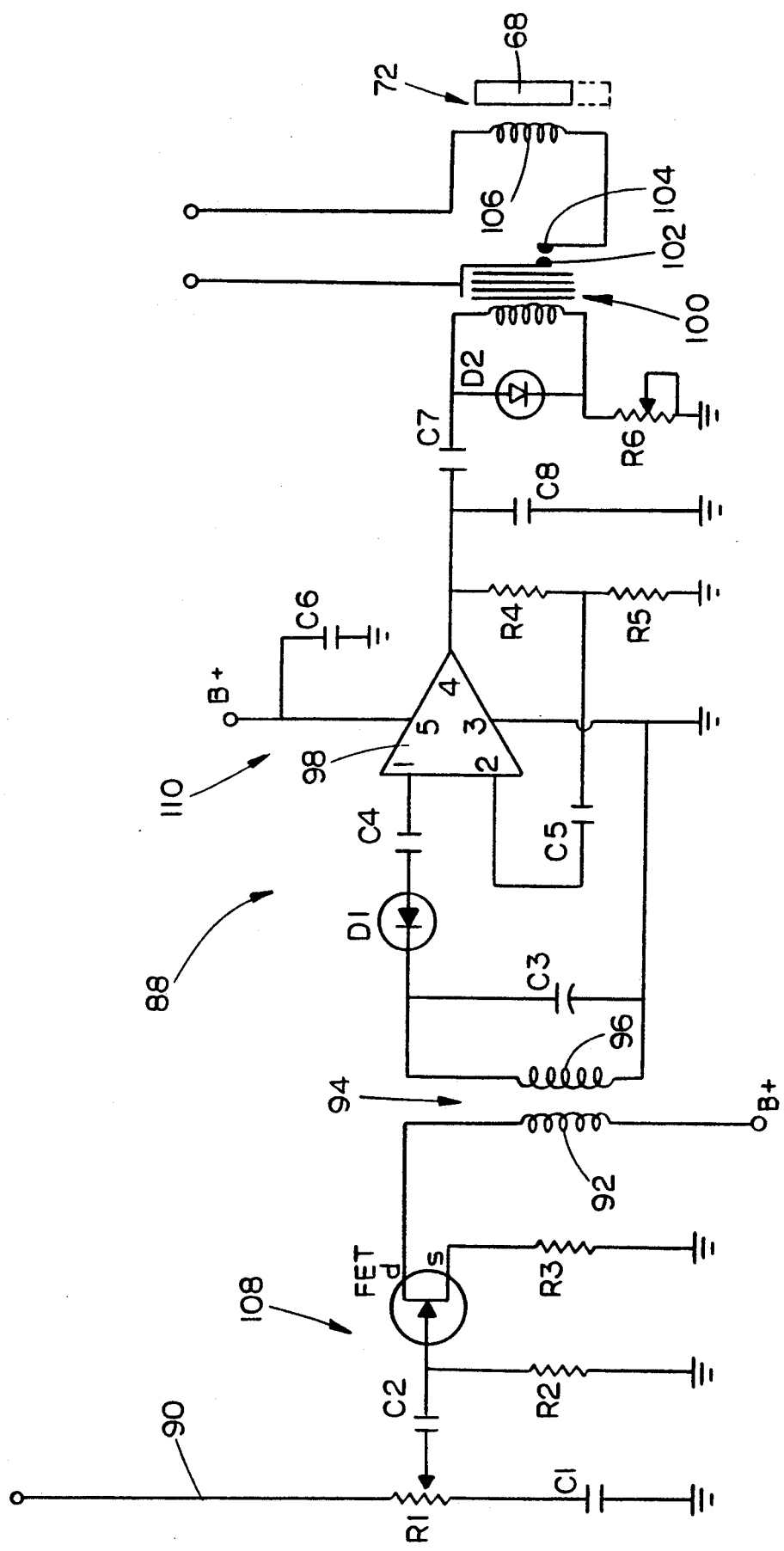
FIG. 5 is a schematic diagram of the electrical circuitry of the present invention.

Referring now to FIG. 5, a sensing circuit is designated generally at 88 and is designed to sense the approach of an electrical storm and activate solenoid 72 of mechanical actuator 36. Antenna 90 is connected to a potentiometer R1, which determines the sensitivity of this element of the circuit, and which is mechanically attached to knob 30 (as shown in FIG. 1). One leg of potentiometer R1 is tied to ground across capacitor C1. The adjustable leg of potentiometer R1 is fed to capacitor C2 and thence to the gate of a field effect field transistor FET. To provide stability to the gate, a resistor R2 extends from the gate and is shunted to the chassis ground of housing 12 (not to earth ground). The source S of transistor FET is also shunted to chassis ground through resistor R3. The drain D of transistor FET is connected across the primary 92 of a radio frequency coil, to B+, a 9 to 12 volt direct current power supply. Thus, this element of sensing circuit 88 comprises a simple radio frequency amplifier with a variable signal input level which is effected through the setting of potentiometer R1 via knob 30.

A variable capacitor C3 is connected in parallel with the secondary coil 96 of transformer 94, with one terminal then shunted to chassis ground. Variable capacitor C3 selectively tunes this secondary circuit. The boosted signal is tuned by a variable capacitor C3 and fed to germanium diode D1 which acts as a detector, wherein the radio frequency signal is converted into an audio signal and then introduced into an audio amplifier, described in more detail hereinbelow. The audio signal is shunted across capacitor C4 from detector D1, capacitor C4 acting as a bypass capacitor, the signal then being fed to pin 1 of an audio amplifier chip 98.

Pin 2 of chip 98 is connected to capacitor C5 and then connected at the terminus of resistors R4 and R5. Resistor R5 is shunted to ground. Pin 3 of chip 98 is directly shunted to ground, and is considered the low side input for the receiver. Pin 4 is the audio output of chip 98 to which the outer terminal of resistor R4 is connected. A capacitor C8 acts as a stabilizing capacitor and has one terminal connected to the output signal from pin 4, and is shunted to ground. Capacitor C8 is preferably located as close to pins 3 and 4 as is physically possible, to give maximum stability. The audio output from pin 4 of chip 98 is then fed through bypass capacitor C7 and connected to a relay 100. Pin 5 of chip 98 is connected to power supply B+, and is shunted to ground through capacitor C6.

A diode D2 is connected across relay 100, and is utilized as an anti-kickback device to prevent damage to chip 98 when the windings of the relay are energized from the audio output. In this case, diode D2 is a switching diode. The signal from chip 98 is then fed from relay 100 and diode D2 through variable resistor R6 and is shunted to ground. Resistor R6 regulates the amount of signal reaching the relay, and therefore serves to limit or reduce false triggering. One contact of relay 100 is connected to a 120 volt AC power source, the outer contact 104 being fed through the windings 106 of solenoid 72 and thence to the neutral lead from the 120 volt power source. In this fashion, the contacts of the relay serve as a switch, which will energize the windings of the solenoid when the switch is closed to thereby move solenoid piston 68 and trigger the mechanical actuator 36, as described hereinabove.

The preferred values of the various resistors and capacitors are as follows:

| | |
|---|---|
| R1 - 100K ohms | C1 - .1 mf |
| R2 - 100K-600K ohms | C2 - .01 mf |
| R3 - 4K ohms | C3 - variable |
| R4 - 220 ohms | C4 - 10 mf |
| R5 - 2.2 ohms | C5 - 470 mf |
| R6 - 20K-100K ohms | C6 - .2 mf |
| | C7 - 2000 mf |
| | C8 - .1 mf |

In operation, static produced by lightning discharge from an approaching storm will be received by antenna 90 and will overcome the resistance of R1 so as to be detected by the detector circuit, designated generally at 108. To reduce the chances of a false triggering, the radio frequency coil 94 should be tuned to a little-used frequency, such as below the AM band. The static is then amplified by the amplifier circuit, designated generally at 110, which then causes relay 100 to activate and close contacts 102 and 104, so as to trigger solenoid 72.

Whereas the invention has been shown and described in connection with the preferred embodiment thereof, it will be understood that many modifications, substitutions and additions may be made which are within the intended broad scope of the appended claims. There has therefore been shown and described an improved unplugging apparatus which accomplishes at least all of the above stated objects.

I claim:

1. An unplugging apparatus for removing a plug from a receptacle in response to the approach of an electrical storm, comprising:
   a mechanical actuator connected to a power cord plug, operable in response to a signal, to pull the plug from a receptacle;
   a hollow housing within which at least a portion of said mechanical actuator is operably mounted;
   said mechanical actuator further comprising:
      pull cord means connected between said plug and an operable trigger arm, said pull cord connected for movement with said trigger arm;
      said trigger arm operable between a first position, wherein the plug is connected to a receptacle, and a second position, wherein said pull cord is pulled longitudinally away from the receptacle to disconnect the plug from said receptacle;
   sensing means for sensing the proximity of an electrical storm and sending a signal to said mechanical actuator to pull said plug;
   said pull cord extending through an aperture in said housing, said trigger arm being located within said housing and said plug being located outside said housing; and
   said mechanical actuator including a selectively operable latch means, selectively operable from a latched position restraining said trigger arm from pivotable movement, and an unlatched position permitting pivotable movement of said trigger arm.

2. The unplugging apparatus of claim 1, wherein said latch means is mounted such that said latched position retains the trigger arm in said first position.

3. The unplugging apparatus of claim 1, wherein said mechanical actuator further comprises a selectively energizable solenoid having an operable piston, said piston being connected to said latch means so as to move said latch to the unlatched position when said solenoid is energized;
   said solenoid being electrically associated with said sensing means, such that a signal from the sensing means will energize said solenoid.

4. An unplugging apparatus for physically separating a plug from a conventional electrical wall receptacle in response to the approach of an electrical storm, comprising:
   a hollow housing, having an interior and exterior and a front wall and side wall;
   a first electrical receptacle mounted in the front wall of said housing, for supplying electricity to an electrical apparatus;
   a power cord having first and second ends, the first end electrically connected to said first receptacle, and the second end having a plug connected thereto adapted for connection to a conventional electrical wall receptacle, for supplying electricity to said first receptacle;
   a mechanical actuator mounted within said housing and having a portion attached to a portion of said plug, operable in response to a signal to pull the plug from an electrical wall receptacle; and
   sensing means for sensing the proximity of an electrical storm and sending a signal to said mechanical actuator to pull said plug.

5. The unplugging apparatus of claim 4, wherein said mechanical actuator includes:
   a trigger arm operable between first and second positions in response to said signal; and
   pull cord means connected between said trigger arm and said plug, such that operation of said trigger arm from said first to said second position will tension the pull cord means so as to pull said plug from an electrical wall receptacle.

6. The unplugging apparatus of claim 4, wherein said trigger arm has an upper end and a lower end and is pivotally mounted at its lower end to a support plate, said trigger arm upper end pivoting between said first and second positions.

7. The unplugging apparatus of claim 6, wherein said mechanical actuator includes biasing means on said support plate for biasing said trigger arm from said first position to said second position.

8. The unplugging apparatus of claim 4, wherein said sensing means includes an electrical detector circuit for detecting static produced by lightning, and for producing a signal in response to the detection of static.

9. The unplugging apparatus of claim 8, wherein said detector circuit is sensitivity-adjustable, such that a signal is produced only upon detection of static of a predetermined magnitude.

10. The unplugging apparatus of claim 8, wherein said detector circuit detects static produced in the form of radio waves of a predetermined frequency and amplitude.

11. The unplugging apparatus of claim 8, wherein said sensing means includes a relay operable to close a second circuit when energized by a signal from said detector circuit.

12. The unplugging apparatus of claim 11, wherein said second circuit includes a solenoid connected so as to be energized upon closing of said second circuit.

* * * * *